US011359906B2

(12) United States Patent
Chen et al.

(10) Patent No.: US 11,359,906 B2
(45) Date of Patent: Jun. 14, 2022

(54) METHOD, SYSTEM AND APPARATUS FOR UNIFORMED SURFACE MEASUREMENT

(71) Applicant: National Taiwan University of Science and Technology, Taipei (TW)

(72) Inventors: Chao-Chang Chen, Taipei (TW); Jen-Chieh Li, Taipei (TW); Yong-Jie Ciou, Taipei (TW); Hsien-Ming Lee, Taipei (TW); Jian-Shian Lin, Taipei (TW); Chun-Chen Chen, Taipei (TW); Ching-Tang Hsueh, Taipei (TW)

(73) Assignee: TA LIANG TECHNOLOGY CO., LTD., Taoyuan (TW)

( * ) Notice: Subject to any disclaimer, the term of this patent is extended or adjusted under 35 U.S.C. 154(b) by 70 days.

(21) Appl. No.: 16/886,971

(22) Filed: May 29, 2020

(65) Prior Publication Data

US 2021/0372764 A1    Dec. 2, 2021

(51) Int. Cl.
*G01B 5/28* (2006.01)
*G01B 5/00* (2006.01)
*B24B 37/30* (2012.01)
*B24B 37/005* (2012.01)
*G01B 5/06* (2006.01)

(52) U.S. Cl.
CPC .............. *G01B 5/28* (2013.01); *B24B 37/005* (2013.01); *B24B 37/30* (2013.01); *G01B 5/0004* (2013.01); *G01B 5/068* (2013.01)

(58) Field of Classification Search
None
See application file for complete search history.

(56) References Cited

U.S. PATENT DOCUMENTS

| 5,617,645 A | * | 4/1997 | Wick | G01B 11/27 33/551 |
| 5,618,447 A | * | 4/1997 | Sandhu | B24B 37/005 216/86 |
| 5,875,559 A | * | 3/1999 | Birang | G01B 7/345 33/553 |

(Continued)

FOREIGN PATENT DOCUMENTS

| EP | 0823309 A1 * | 2/1998 | ........... G01B 11/306 |
| TW | 200529973 | 9/2005 | |

(Continued)

OTHER PUBLICATIONS

Taiwanese Office Action for Taiwanese Patent Application No. 109118099 dated Aug. 16, 2021.

*Primary Examiner* — Christopher W Fulton
(74) *Attorney, Agent, or Firm* — Amin, Turocy & Watson, LLP

(57) ABSTRACT

A system and a method for uniformed surface measurement are provided, in which a sensor is provided to perform measurements on a carrier in a polishing machine, and a measuring trajectory of the sensor on the carrier is adjusted by controlling the pivoting of a sensor carrier carrying the sensor and the rotation of a rotating platform in the polishing machine in order to achieve uniformed surface measurements of the carrier and real-time constructions of the surface topography. This allows the polishing state of the carrier to be monitored in real time, thereby improving the efficiency of the polishing process. A sensing apparatus for uniformed surface measurement is also provided.

20 Claims, 6 Drawing Sheets

(56) References Cited

U.S. PATENT DOCUMENTS

| | | | | |
|---|---|---|---|---|
| 5,948,203 | A * | 9/1999 | Wang | B24B 49/12 156/345.13 |
| 6,536,128 | B2 * | 3/2003 | Glanzmann | G01B 5/0004 33/553 |
| 8,221,193 | B2 * | 7/2012 | Chang | B24B 37/042 451/6 |
| 9,970,754 | B2 * | 5/2018 | Cho | G01B 11/0608 |
| 2009/0280580 | A1 * | 11/2009 | Manens | B24B 53/12 438/7 |
| 2012/0270477 | A1 * | 10/2012 | Nangoy | B24B 53/017 451/56 |
| 2017/0059311 | A1 | 3/2017 | Cho et al. | |
| 2018/0229343 | A1 * | 8/2018 | Kim | H01L 21/67248 |
| 2020/0164486 | A1 * | 5/2020 | Che | B24B 37/26 |
| 2020/0269382 | A1 * | 8/2020 | Huang | B24B 49/12 |
| 2020/0298368 | A1 * | 9/2020 | Osterheld | G06T 7/529 |

FOREIGN PATENT DOCUMENTS

| | | |
|---|---|---|
| TW | 201443977 | 11/2014 |
| TW | 201515769 | 5/2015 |
| TW | 201715611 | 5/2017 |
| TW | 201732223 | 9/2017 |
| TW | 201819850 | 6/2018 |
| TW | 201843012 | 12/2018 |
| TW | 201924857 | 7/2019 |

* cited by examiner

METHOD, SYSTEM AND APPARATUS FOR UNIFORMED SURFACE MEASUREMENT

BACKGROUND

1. Technical Field

The present disclosure relates to a surface measuring technique, and more particularly, to a method, system and sensing apparatus for uniformed surface measurement of a carrier during a polishing process.

2. Description of Related Art

In the manufacturing of integrated circuits (ICs), a polishing process such as chemical mechanical planarization polishing (CMP) is often required to polish or planarize a wafer and/or a substrate, so as to reduce the difficulty in focusing during subsequent exposures of the wafer and/or the substrate as a result of the increased number of stacked layers in a semiconductor component.

In a conventional polishing machine for the polishing process, a wafer or a substrate to be polished is placed between a holder and a rotating platform overlaid with a carrier (e.g. a polishing pad or a lapping disk with or without an abrasive, a polishing pad, a lapping disk or a platen with or without trenches, etc.), and slurry is applied onto the carrier for polishing the wafer or the substrate. It can be seen that the carrier is one of the important factors for determining the polishing efficiency of the wafer or the substrate.

In the above polishing machine, the carrier often wears out over time and requires replacement. However, there is currently no good mechanisms for monitoring the status of use of the carrier in real time in the existing polishing machines. Furthermore, due to the large area and non-removable characteristic of the carriers once they are installed, how to effectively monitor a carrier during manufacturing processes can be a challenge. As a result, the technical specialist often resorts to evaluating the surface condition of the carrier to determine if it needs replacement based on experience. This frequently leads to a waste of money if the carriers are replaced too early or poor polishing quality if the carriers are replaced too late.

Therefore, there is a need for a method, system and sensing apparatus for uniformed surface measurement on a carrier of a polishing machine that addresses the aforementioned shortcomings in the prior art.

SUMMARY OF THE DISCLOSURE

A system for uniformed surface measurement is provided, which may include a polishing machine, a sensor carrier and a sensor. The polishing machine may include a carrier for carrying a wafer; and a rotating platform with the carrier disposed thereon for rotating the carrier around a center of the rotating platform as an axis. The sensor carrier may include a shaft disposed outside of the rotating platform and an arm pivotally connected with the shaft and extending above the carrier. The sensor carrier is configured in such a way that the arm pivots around the shaft as an axis and above the rotating platform. The sensor may be disposed at a free end of the arm of the sensor carrier for extracting surface information of the carrier.

The above system may further include a control module electrically connected with the rotating platform, the sensor carrier and the sensor. The control module is configured for: receiving the surface information of the carrier extracted by the sensor; controlling a measuring trajectory of the sensor for extracting the surface information of the carrier; and constructing a surface topography of the carrier based on the surface information. The electrical connection includes wired or wireless signal transmission.

In the above system, the controlling a measuring trajectory of the sensor for extracting the surface information of the carrier by the control module may include the following steps of: controlling the rotating platform to rotate around the center of the rotating platform as an axis in a constant direction at a constant rotating speed; controlling a pivoting area of the sensor carrier between an edge of the rotating platform and the center; and controlling a pivoting speed of the sensor carrier, such that the sensor moves on a line from the edge of the rotating platform to the center at a constant speed.

In the above system, the measuring trajectory includes spiral loops spaced at a same interval. In another embodiment, the measuring trajectory is spiral loops spaced at a same interval.

The above system may further include an output device electrically connected with the control module for visually displaying the surface topography of the carrier.

In the above system, the control module is further configured for determining a service life of the carrier based on the surface information of the carrier, and when the service life of the carrier comes to an end, the control module generates and outputs a warning message to the output device.

In the above system, the surface information may be a height information of a surface of the carrier.

A method for uniformed surface measurement is provided, which may include the following steps of disposing a carrier on a rotating platform of a polishing machine; controlling the rotating platform to rotate the carrier around a center of the rotating platform as an axis; disposing a sensor at a free end of an arm of a sensor carrier to suspend the sensor above the carrier; controlling the arm of the sensor carrier to pivot around a shaft of the sensor carrier as an axis and above the rotating platform, wherein the shaft is disposed outside the rotating platform; controlling the sensor to extract a surface information of the carrier; adjusting a measuring trajectory of the sensor for extracting the surface information of the carrier; and constructing a surface topography of the carrier based on the surface information.

In the above method, a step of the adjusting a measuring trajectory of the sensor for extracting the surface information of the carrier may include the following sub-steps of: controlling the rotating platform to rotate around the center of the rotating platform as an axis in a constant direction at a constant rotating speed; controlling a pivoting area of the sensor carrier between an edge of the rotating platform and the center; and controlling a pivoting speed of the sensor carrier, such that the sensor moves on a line from the edge of the rotating platform to the center at a constant speed.

In the above method, the measuring trajectory includes spiral loops spaced at a same interval. In another embodiment, the measuring trajectory is spiral loops spaced at a same interval.

The above method may further include visually displaying the surface topography of the carrier on an output device.

The above method may further include determining a service life of the carrier based on the surface information of the carrier, and when the service life of the carrier comes to an end, generating and outputting a warning message to the output device.

In the above method, the surface information may be a height information of a surface of the carrier.

A sensing apparatus for uniformed surface measurement is provided, which may include: a sensor carrier including a shaft disposed outside a rotating platform and an arm pivotally connected with the shaft and extending to above a carrier, such that the arm pivots around the shaft as an axis and above the rotating platform; and a sensor disposed at a free end of the arm of the sensor carrier for extracting surface information of the carrier.

As can be seen from the above, the system, method and sensing apparatus for uniformed surface measurement in accordance with the present disclosure are provided with the sensor to perform measurements on the carrier in the polishing machine, and the measuring trajectory of the sensor on the carrier is adjusted by controlling the pivoting of the sensor carrier carrying the sensor and the rotation of the rotating platform in the polishing machine in order to achieve uniformed surface measurement of the carrier and real-time construction of the surface topography and allow real-time monitoring of the polishing state the carrier is in, thereby improving the efficiency of the polishing process.

DETAILED DESCRIPTION OF THE EMBODIMENTS

Figure 1:
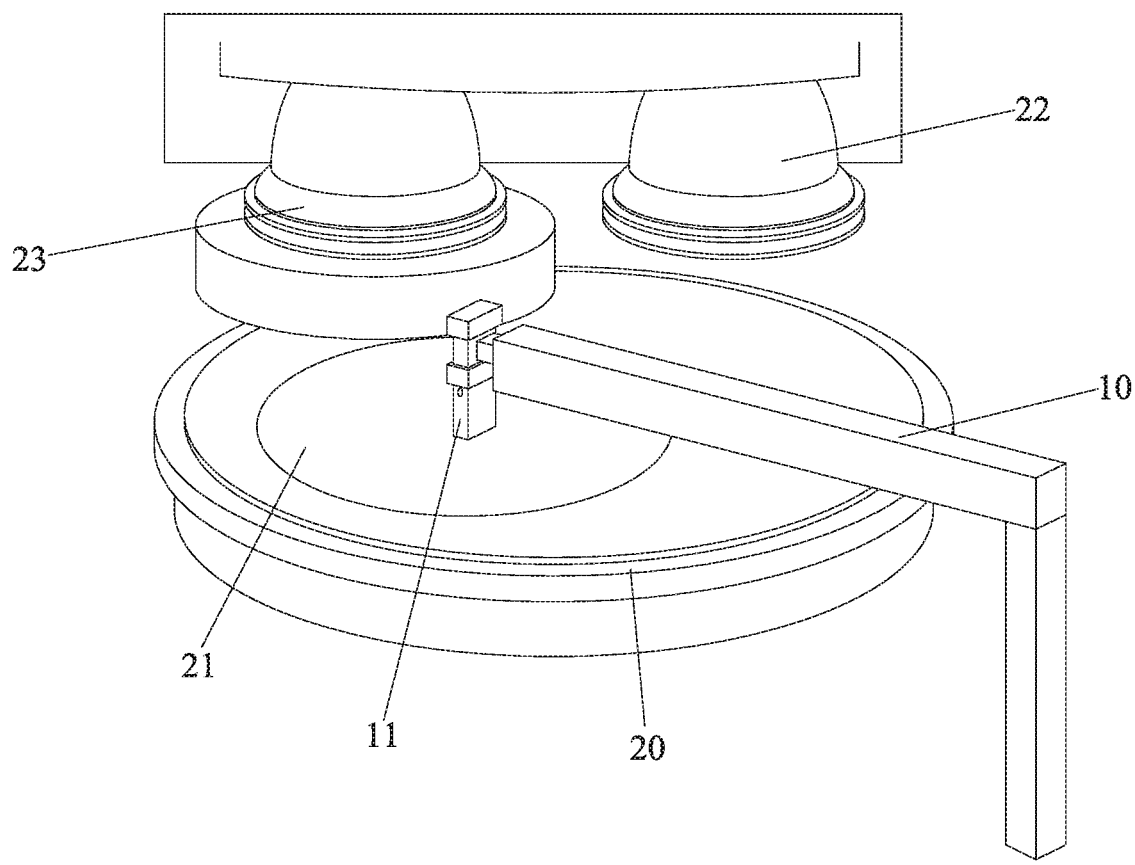
FIG. 1 is a diagram depicting structures in a system for surface measurement in accordance with an embodiment of the present disclosure.

Implementations of the present disclosure are described below by specific embodiments. Other advantages and technical effects of the present disclosure can be readily understood by one of ordinary skill in the art upon reading the disclosure of this specification.

It should be noted that the structures, ratios, sizes and the like shown in the drawings appended to this specification are provided in conjunction with the disclosure of this specification in order to facilitate understanding by those skilled in the art. They are not meant, in any ways, to limit the implementations of the present disclosure, and therefore have no substantial technical meaning. Without influencing the effects created and objectives achieved by the present invention, any modifications, changes or adjustments to the structures, ratios or sizes are construed as fall within the scope covered by the technical contents disclosed herein.

Referring to FIG. 1, a system in accordance with the present disclosure is applicable to a polishing machine (e.g. a CMP polishing machine) for wafer and/or substrate polishing. The polishing machine includes a rotating platform 20 provided with a carrier 21 (e.g. a polishing pad or a lapping disk with or without an abrasive, a polishing pad, a lapping disk or a platen with or without trenches, or the like), a holder 23 (e.g. a polishing head) for holding the wafer or substrate in place above the carrier 21 for polishing, and a conditioner 22 (e.g. a diamond disk) for conditioning, cleaning and roughening the carrier 21 during the polishing process.

In addition to the above, the system in accordance with the present disclosure is further provided with an off-site sensing apparatus, which includes a sensor carrier 10 and a sensor 11. The sensor carrier 10 oscillates (i.e. pivots) around its shaft $O_d$ (disposed outside the rotating platform 20) and above the carrier 21, and the sensor 11 is suspended from a free end of an arm that is pivotally connected with the shaft $O_d$ on the sensor carrier 10, so as to perform surface measurements on the carrier 21 with the rotation of the sensor carrier 10. It should be noted that although the sensor carrier 10 in this embodiment is shown in the form of a mechanical arm, one of ordinary skill in the art can understand that, depending on the needs, the sensor carrier 10 can also be implemented in other forms capable of carrying the sensor 11.

Figure 2:
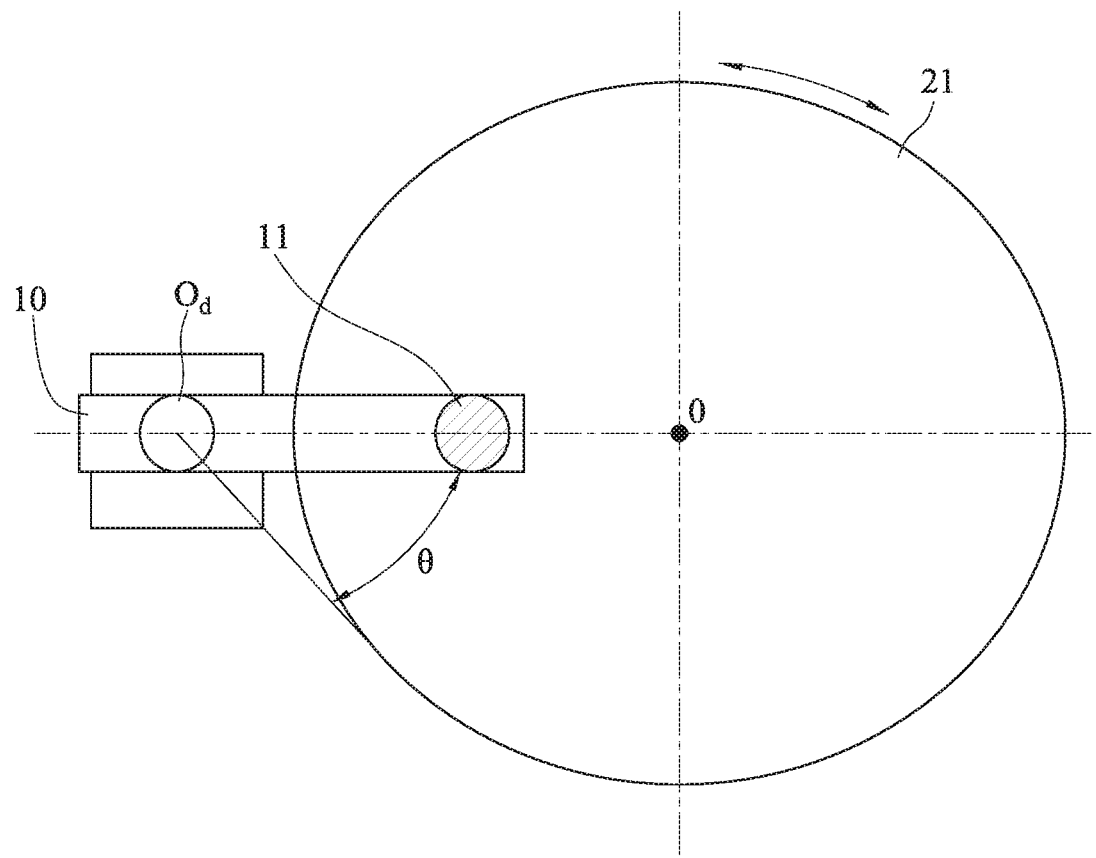
FIG. 2 is a top view depicting the system for surface measurement in accordance with an embodiment of the present disclosure.

Referring to FIG. 2, a top view depicting an implementation of the sensor 11 sweeping above the carrier 21 disposed on the rotating platform 20 in accordance with the present disclosure is shown. In this drawing, the other components of the polishing machine are omitted for simplicity. It can be seen that the sensor carrier 10 oscillates between a sweeping angle θ above the carrier 21 disposed on the rotating platform 20 using as its shaft $O_d$ as the pivot. Thus, the sensor 11 suspended at the free end of or embedded inside the arm of the sensor carrier 10 moves back and forth radially on the rotating platform 20 with respect to the center O, and performs complete surface measurements of the carrier 21 while the rotating platform 20 is rotating the carrier 21 around the center O. It should be noted that, in this embodiment, the carrier 21 is set to a size with surface area similar to that of the rotating platform 20 and placed coaxially with the center O. However, depending on the needs, the carrier 21 can have a size with surface area smaller than that of the rotating platform 20 and not coaxially placed with the center O, and the present disclosure is not limited to the above configurations.

Figure 3:
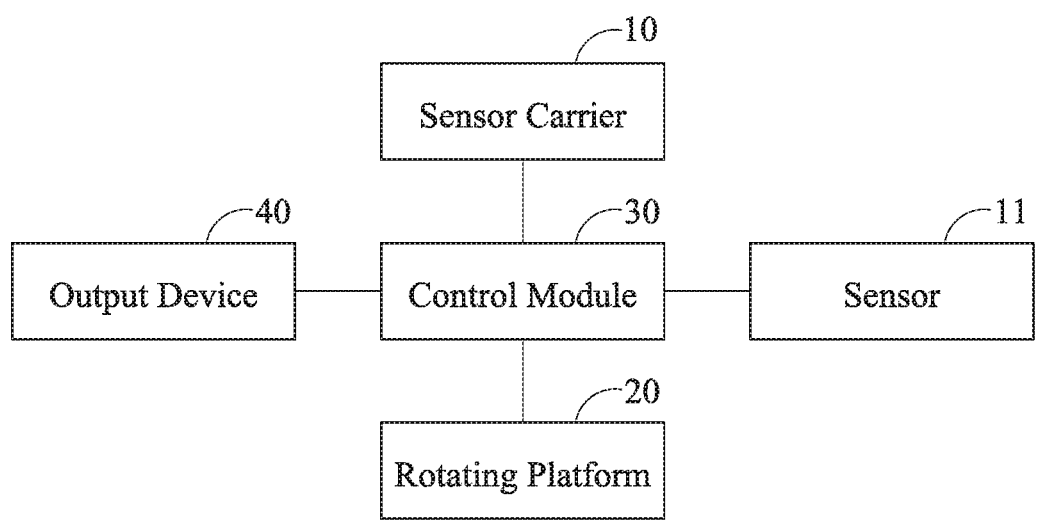
FIG. 3 is a diagram depicting the relationships between components in the system for surface measurement in accordance with an embodiment of the present disclosure.

In one implementation of the present invention, pivoting of the sensor carrier 10, rotation of the rotating platform 20 and surface measurement of the sensor 11 can all be adjusted by a control module 30 as shown in FIG. 3. More specifically, the control module 30 can be provided in the system of the present disclosure as a software, a hardware or a firmware, and can be electrically connected with the sensing apparatus, the sensor carrier 10, the sensor 11 and the rotating platform 20 in a wired or wireless manner (e.g. the above components may communicate with each other through wired or wireless signals). The control module 30 is configured for setting the pivoting of the sensor carrier 10 or the rotating speed of the rotating platform 20 according to requirements of surface measurement, receiving surface information measured by the sensor 11, and turning on or off the surface measuring process.

In one embodiment, the control module 30 controls the measuring location of the sensor 11 on a radial direction of the rotating platform 20 with respect to the center O by adjusting the sweeping angle θ of the sensor carrier 10. For example, if the location on the carrier 21 to be measured is further away from the center O of the rotating platform 20, the control module 30 can adjust the sweeping angle θ of the sensor carrier 10 to a smaller value, such that the sensor 11 extracts surface information from a location further away from the center O. On the contrary, if the location on the carrier 21 to be measured is closer to the center O of the rotating platform 20, the control module 30 can adjust the sweeping angle θ of the sensor carrier 10 to a larger value, such that the sensor 11 moves closer to the center O and extracts surface information therefrom.

In another embodiment, the control module 30 controls a measuring segment on the carrier 21 by adjusting the rotation of the rotating platform 20. For example, the control module 30 can rotate clockwise or anticlockwise at a constant or non-constant speed, so that the sensor 11 will not repeatedly perform surface measurements on a same segment, but instead perform surface measurements around the center O of the rotating platform 20 in a cycle manner.

In yet another embodiment, the control module 30 is equipped with an imaging application (e.g. color conjugate imaging) apparatus or other similar apparatus, and the sensor 11 is a probe for imaging (e.g. an optical, electromagnetic or inductive non-contact sensor), which is configured to extract height information (i.e. thickness information of the carrier 21) of surface of the carrier 21. Therefore, with the imaging application of the control module 30, the height information extracted by the sensor 11 can be used by the control module 30 to construct the surface topography (e.g. the 3D surface structure) of the carrier 21 in real time. Furthermore, since the control module 30 dynamically constructs the surface topography of the carrier 21 in real time, the variations in the surface topography of the carrier 21 can be dynamically updated in real time by the control module 30 when the sensor 11 is performing surface measurements while the sensor carrier 10 is pivoting and the rotating platform 20 is rotating. This allows online real-time monitoring of the polishing state of the surface of the carrier 21.

In another embodiment, the control module 30 can also turn on or off surface measurement based on the operating status of the polishing machine. For example, during replacement of the carrier 21, the control module 30 can halt the operations of the sensor 11, the sensor carrier 10 and the rotating platform 20, so as to avoid wrong measurements being taken. In an additional embodiment, the control module 30 can also turn on or off surface measurement based on the requirements of the manufacturing processes to be carried out by the polishing machine. For example, surface monitoring can be set to happen periodically in the manufacturing processes, so when surface measurement is turned off, the control module 30 halts the operations of the sensor 11 and the sensor carrier 10 to save the overall processing time.

The control module 30 of the present disclosure can be further electrically connected with an output device 40, wherein the output device 40 is, for example, a tablet or a computer monitor etc., and the present disclosure is not limited to these. The output device 40 is used to visually display the surface topography constructed in real time by the control module 30 during surface measurement performed by the sensor 11. This allows variations in surface topography of the carrier 21 to be observed by a technical specialist during operations of the polishing machine, so that whether the carrier 21 needs replacing can be determined.

In an alternative embodiment, the output device 40 can also be used as a medium by the control module 30 to send alerts to the technical specialist operating the polishing machine. For example, during construction of the surface topography of the carrier 21, the control module 30 can determine whether the service life of the carrier 21 comes to an end based on the surface information (e.g. by defining in advance a criteria for determining the service life of the carrier 21), and if needed, display a warning message on the output device 40 while the surface topography of the carrier 21 is being outputted to remind the technical specialist to replace the carrier 21.

In an embodiment of the present invention, in order to achieve complete surface measurements of the carrier 21, the control module 30 preferably controls the rotating platform 20 to continuously rotate (e.g. clockwise or anticlockwise) in a same direction around the center O, and controls the sweeping angle θ of the sensor carrier 10 at a value such that the pivoting area of the sensor carrier 10 is between the center O of the rotating platform 20 to an edge of the rotating platform 20, enabling the sensor 11 to measure every location on the carrier 21 disposed on the rotating platform 20 within each cycle of the rotation of the rotating platform 20 and the pivoting of the sensor carrier 10.

Figure 4:
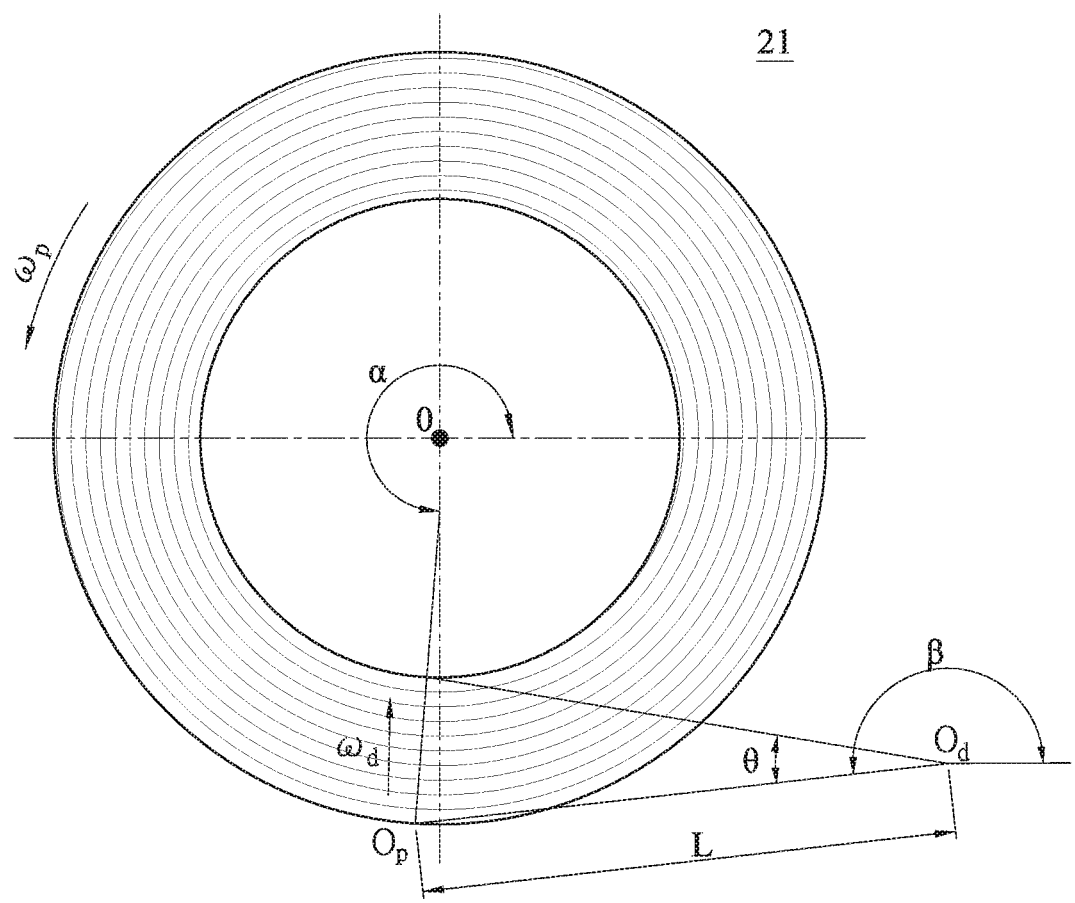
FIG. 4 is a diagram depicting an implementation of a method and system for surface measurement in accordance with an embodiment of the present disclosure.

In the way described above, the measuring trajectory of the sensor 11 on the rotating platform 20 is in the form of spiral loops as shown in FIG. 4. In a standardized measuring trajectory shown in FIG. 4, the rotating platform 20 rotates the carrier 21 about the center O at a speed $\omega_p$, and the sensor carrier 10 carries the sensor 11 to pivot back and forth radially with respect to the rotating platform 20 towards the center O at a speed $\omega_d$. Meanwhile, the measuring location of the sensor 11 relative to rotating platform 20 is represented by $O_p$. A trajectory function of the standardized measuring trajectory of the location $O_p$ of the sensor 11 can be represented by the following equations 1 and 2:

$$\begin{bmatrix} X_{(t)} \\ Y_{(t)} \end{bmatrix} = D \begin{bmatrix} \cos(\alpha - \omega \times t) \\ \sin(\alpha - \omega \times t) \end{bmatrix} \quad \text{(eq. 1)}$$

$$D = \sqrt{(d_x + L \times \cos(\beta - \omega_d \times t))^2 + (d_y + L \times \cos(\beta - \omega_d \times t))^2} \quad \text{(eq. 2)}$$

In the equations 1 and 2 described above, $X_{(t)}$ and $Y_{(t)}$ denote values of the location $O_p$ of the sensor 11 with respect to time function; α denotes the initial angle of the measuring of the carrier 21; β denotes the initial angle of the measuring of the pivoting of the sensor carrier 10; D denotes the distance from the center O of the rotating platform 20 to the location $O_p$ of the sensor 11; L denotes the length of the sensor carrier 10 (i.e. the distance from the sensor 11 to the shaft $O_d$ of the sensor carrier 10; ω denotes the rotating speed of the measuring trajectory with respect to the center of the rotating platform 20; and $d_x$ and $d_y$ denote the distance from the shaft $O_d$ of the sensor carrier 10 to the center O of the rotating platform 20.

By adjusting the speeds $\omega_p$ and $\omega_d$ of the rotating platform 20 and the sensor carrier 10 using the control module 30, the results of the above equations 1 and 2 will be different, and the measuring trajectory in FIG. 4 will become spiral loops of different intervals. However, it should be noted that spiral loops of uneven intervals may result in missed measurement by the sensor 11 during surface measurement of the carrier 21 (for example, if an interval between the spiral loops of the measuring trajectory is too large, then the area between the interval on the carrier 21 may possibly not be measured by the sensor 11). As a result, the actual surface condition on the carrier 21 cannot be accurately constructed. In view of this, the control module 30 of the present disclosure can further adjust the trajectory function of the measuring trajectory of the sensor 11, such that complete condition of the surface of the carrier 21 can be measured with each cycle of rotation of the rotating platform 20 or pivoting of the sensor carrier 10.

Figure 5:
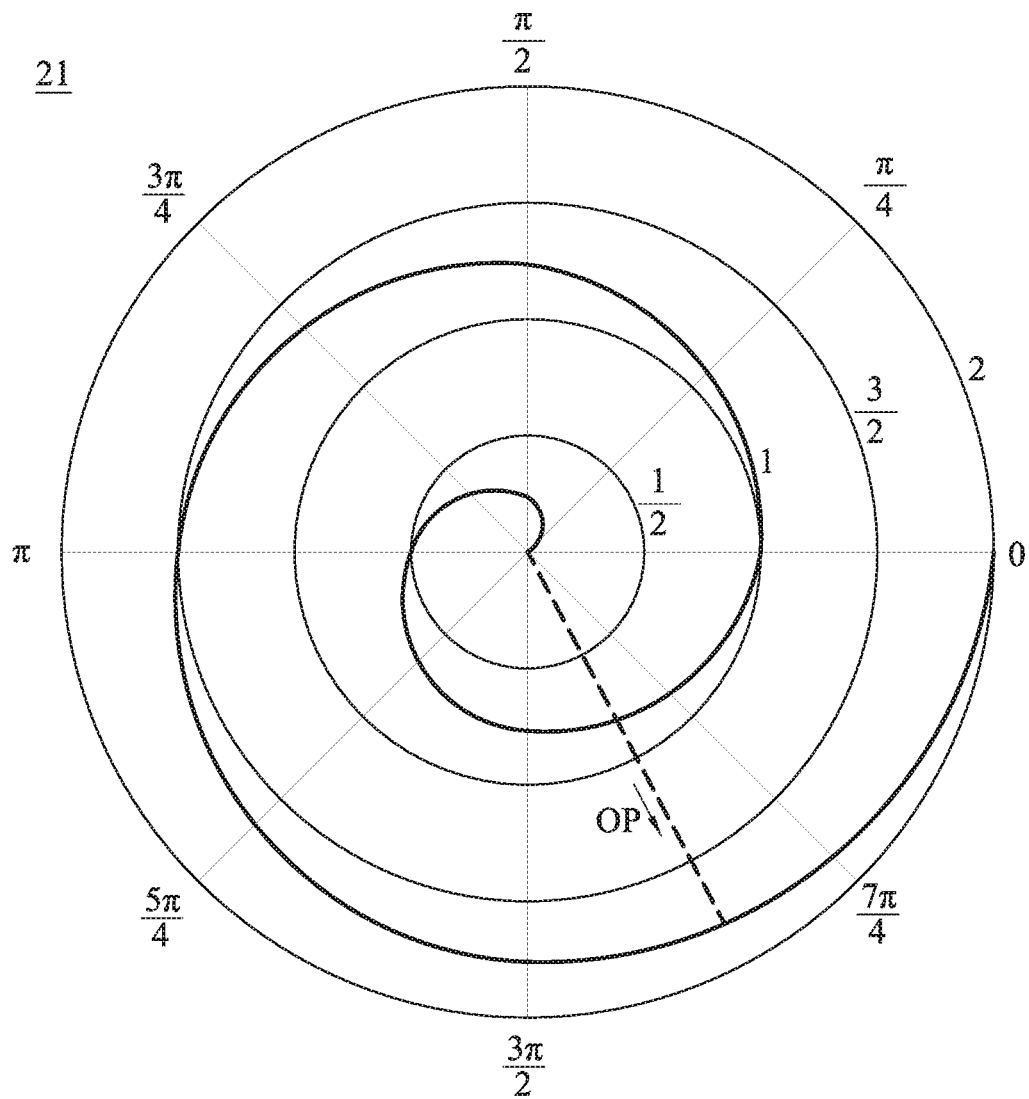
FIG. 5 is a diagram depicting an implementation of a method and system for surface measurement in accordance with an embodiment of the present disclosure.

In order to achieve complete measurements of the carrier 21, an implementation of the present disclosure includes adjusting the measuring trajectory of the sensor 11 on the rotating platform 20 to the form of an Archimedean spiral by the control module 30. As shown in FIG. 5, the Archimedean spiral is defined as: when the location $O_p$ of the sensor 11 on the rotating platform 20 moves radially with respect to the center O, the sensor 11 moves at a constant speed on a line $\overrightarrow{OP}$ from the sensor 11 towards the center O, and meanwhile this line $\overrightarrow{OP}$ rotates about the center O at a constant angular speed, so that the spiral loops of the measuring trajectory of the sensor 11 are of a same interval. Thus, this type of spiral is also called a constant-speed spiral.

For example, the measuring trajectory of the sensor 11 on the surface of the carrier 21 can be represented in polar coordinates: r=a+bθ. Herein, when the measuring trajectory is adjusted into a constant-speed spiral, the interval between the spiral loops is always equal to 2πb. In this embodiment, the speeds $\omega_p$ and $\omega_d$ of the rotating platform 20 and the sensor carrier 10 can be adjusted in the following manner, such that the measuring trajectory of the sensor 11 approximates the aforementioned constant-speed spiral.

First, assuming the pivoting speed of the sensor carrier 10 without adjustment is $\omega_d$, the speed component of the sensor 11 on the line $\overrightarrow{OP}$ connected to the center O on the rotating platform 20 can be derived as $\omega_d * L * \cos(\beta+\omega_d t)$. Then, the pivoting speed $\omega_m$ of the sensor carrier 10 after adjustment is defined below:

$$\omega_m = \omega_d * \sec(\beta+\omega_d t) \quad \text{(eq. 3)}$$

As a result, the speed component of the sensor 11 on the line $\overrightarrow{OP}$ connected to the center O on the rotating platform 20 meets the following equation 4:

$$\omega_m * L * \cos(\beta+\omega_d \times t) = \omega_d L * \sec(\beta+w_d t) * \cos(\beta+\omega_d t) = \omega_d \times L \quad \text{(eq. 4)}$$

Finally, the rotating speed $\omega_p$ of the rotating platform 20 is controlled at a constant value, which means the trajectory function (e.g. equations 1 and 2 above) of the measuring trajectory of the sensor 11 on the rotating platform 20 can be controlled to approximate the constant-speed spiral.

Due to the aforementioned adjustment, the measuring trajectory of the sensor 11 on the rotating platform 20 approximates the constant-speed spiral, the interval between the spiral loops is constant, and the sensor 11 is able to uniformly obtain surface information (e.g. height information) of the carrier 21 each time the sensor carrier 10 and the rotating platform 20 completes one cycle of pivoting and rotation without being influenced by the speed of the sensor 11 relative to the speed of the carrier 21 while moving. As such, the surface topography of the carrier 21 constructed by the control module 30 more accurately reflects the actual condition at the time, allowing one to more effectively analyze the polishing state of the surface of the carrier 21.

Figure 6:
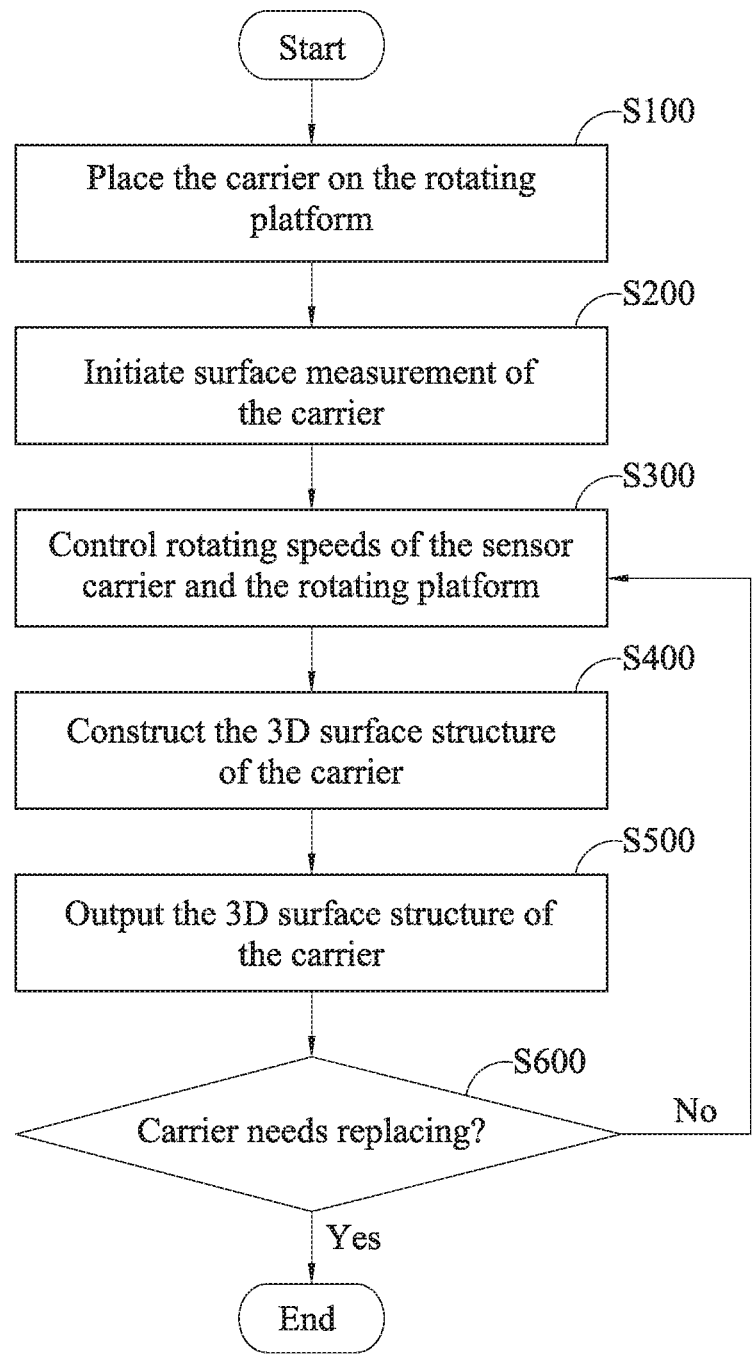
FIG. 6 is a flowchart illustrating steps of a method for surface measurement in accordance with an embodiment of the present disclosure.

Referring to FIG. 6, a flowchart illustrating a method for surface measurement in accordance with the present disclosure is shown. For convenience, components that are the same as or similar to those shown in FIGS. 1 to 5 are denoted with the same reference numerals.

As described before, the control module 30 can turn on or off surface measurement based on the operating status of the polishing machine. Thus, in step S100, the control module 30 confirms that the carrier 21 is placed on the rotating platform 20 of the polishing machine to ensure that there is no abnormality or idle system run when surface measurements of the carrier 21 begin.

Proceed to step S200, after confirming the carrier 21 is placed on the rotating platform 20, the control module 30 initiates surface measurement of the carrier 21, including initiating pivoting of the sensor carrier 10, rotation of the rotating platform 20 and extraction of surface information from the carrier 21 by the sensor 11.

In step S300, in order for the sensor 11 to uniformly obtain surface information (e.g. height information) of the carrier 21, the control module 30 further controls the pivoting speed of the sensor carrier 10 and the rotating speed of the rotating platform 20 (and along with the carrier 21), such that the measuring trajectory of the sensor 11 on the surface of the rotating platform 20 approximates a constant-speed spiral (as shown in FIGS. 4 and 5).

In step S400, during pivoting of the sensor 11 along with the sensor carrier 10 and rotation of the rotating platform 20, the surface information of the carrier 21 extracted by the sensor 11 is constructed by the control module 30 into a surface topography of the carrier 21.

Then, in step S500, the surface topography of the carrier 21 constructed by the control module 30 is visually displayed by the output device 40 to facilitate a technical specialist operating the polishing machine in analyzing the polishing state of the surface of the carrier 21.

Finally, in step S600, the technical specialist operating the polishing machine observes variations in the surface topography of the carrier 21 displayed by the output device 40 to determine whether the carrier 21 needs to be replaced (i.e. whether the service life of the carrier 21 comes to an end). In an alternative embodiment, the control module 30 predefines criteria for determining the service life of the carrier 21, and alerts the technical specialist to replace the carrier 21 when the carrier 21 needs to be replaced (e.g. display a warning message on the output device 40). Meanwhile, if the carrier 21 does not need replacing, the control module 30 performs steps S300 to S500 repeatedly to continue the control of the operations of the sensor carrier 10 and the rotating platform 20, the surface measurement by the sensor 11 and the reconstruction of the surface topography of the carrier 21 to dynamically update variations in the surface topography of the carrier 21 for the technical specialist. On the other hand, when it is determined that the carrier 21 needs replacing, the control module 30 halts the operations of the sensor carrier 10, the rotating platform 20 and the sensor 11 to allow the technical specialist to replace the carrier 21.

In summary, the system, method and sensing apparatus for uniformed surface measurement in accordance with the present disclosure are provided with a sensor to perform measurements on a carrier in a polishing machine, and a measuring trajectory of the sensor on the carrier is adjusted by controlling the pivoting of a sensor carrier carrying the sensor and the rotation of a rotating platform in the polishing machine in order to achieve uniformed surface measurement of the carrier and real-time construction of the surface topography and allow real-time monitoring of the polishing state of the carrier, thereby improving the efficiency of the polishing process.

What is claimed is:
1. A system for uniformed surface measurement comprising:
a polishing machine comprising:
a carrier for carrying a wafer; and a rotating platform with the carrier disposed thereon for rotating the carrier around a center of the rotating platform as a first axis;

a sensor carrier comprising a shaft disposed outside of the rotating platform and an arm pivotally connected with the shaft and extending above the carrier, the sensor carrier being configured in such a way that the arm pivots around the shaft as a second axis and above the rotating platform;

a sensor disposed at a free end of the arm of the sensor carrier for extracting surface information of the carrier; and a control module electrically connected with the rotating platform, the sensor carrier and the sensor, and the control module being configured for controlling a measuring trajectory of the sensor for extracting the surface information of the carrier, wherein the control module controls a pivoting speed of the sensor carrier, such that the sensor move on a line from an edge of the rotating platform to the center at a constant speed.

2. The system of claim 1, wherein the control module is further configured for:

receiving the surface information of the carrier extracted by the sensor; and constructing a surface topography of the carrier based on the surface information.

3. The system of claim 2, further comprising an output device electrically connected with the control module for visually displaying the surface topography of the carrier.

4. The system of claim 2, wherein the control module is further configured for determining a service life of the carrier based on the surface information of the carrier.

5. The system of claim 4, wherein when the service life of the carrier comes to an end, the control module generates and outputs a warning message to the output device.

6. The system of claim 1, wherein the control module further controls the rotating platform to rotate around the center of the rotating platform as the first axis in a constant direction at a constant rotating speed, and controls a pivoting area of the sensor carrier between the edge of the rotating platform and the center.

7. The system of claim 1, wherein the measuring trajectory includes spiral loops spaced at a same interval.

8. The system of claim 1, wherein the surface information is a height information of a surface of the carrier.

9. A method for uniformed surface measurement, the method comprising:

disposing a carrier on a rotating platform of a polishing machine;

controlling the rotating platform to rotate the carrier around a center of the rotating platform as a first axis;

disposing a sensor at a free end of an arm of a sensor carrier to suspend the sensor above the carrier;

controlling the arm of the sensor carrier to pivot around a shaft of the sensor carrier as a second axis and above the rotating platform, wherein the shaft is disposed outside the rotating platform;

controlling the sensor to extract surface information of the carrier;

adjusting a measuring trajectory of the sensor for extracting the surface information of the carrier to control a pivoting speed of the sensor carrier, such that the sensor moves on a line from an edge of the rotating platform to the center at a constant speed; and constructing a surface topography of the carrier based on the surface information.

10. The method of claim 9, wherein the adjusting the measuring trajectory of the sensor for extracting the surface information of the carrier further comprises:

controlling the rotating platform to rotate around the center of the rotating platform as the first axis in a constant direction at a constant rotating speed; and controlling a pivoting area of the sensor carrier between the edge of the rotating platform and the center.

11. The method of claim 9, wherein the measuring trajectory includes spiral loops spaced at a same interval.

12. The method of claim 9, further comprising visually displaying the surface topography of the carrier on an output device.

13. The method of claim 9, further comprising determining a service life of the carrier based on the surface information of the carrier.

14. The method of claim 13, further comprising generating and outputting a warning message to the output device when the service life of the carrier comes to an end.

15. The method of claim 9, wherein the surface information is a height information of a surface of the carrier.

16. An apparatus for uniformed surface measurement comprising:

a sensor carrier comprising a shaft disposed outside a rotating platform and an arm pivotally connected with the shaft and extending to above a carrier, the sensor carrier being configured such that the arm pivots around the shaft as an axis and above the rotating platform;

a sensor disposed at a free end of the arm of the sensor carrier for extracting surface information of the carrier; and a control module electrically connected with the sensor carrier and the sensor, and the control module being configured for controlling a measuring trajectory of the sensor for extracting the surface information of the carrier, wherein the control module controls a pivoting speed of the sensor carrier, such that the sensor moves on a line from an edge of the rotating platform to a center at a constant speed.

17. The apparatus of claim 16, wherein the surface information is a height information of a surface of the carrier.

18. The apparatus of claim 16, wherein the control module is further configured for:

receiving the surface information of the carrier extracted by the sensor; and constructing a surface topography of the carrier based on the surface information.

19. The apparatus of claim 18, further comprising an output device electrically connected with the control module for visually displaying the surface topography of the carrier.

20. The apparatus of claim 16, wherein the measuring trajectory includes spiral loops spaced at a same interval.

* * * * *